United States Patent [19]

Leigh

[11] 4,304,762

[45] Dec. 8, 1981

[54] STABILIZATION OF HYDROGEN PEROXIDE

[75] Inventor: Arthur G. Leigh, Wirral, England

[73] Assignee: Lever Brothers Company, New York, N.Y.

[21] Appl. No.: 77,963

[22] Filed: Sep. 24, 1979

[30] Foreign Application Priority Data

Sep. 27, 1978 [GB] United Kingdom ............... 38346/78

[51] Int. Cl.³ ............................................. C01B 15/02
[52] U.S. Cl. ..................................... 423/272; 423/273
[58] Field of Search ....................... 423/272, 273, 584; 252/186

[56] References Cited

U.S. PATENT DOCUMENTS

| 3,383,174 | 5/1968 | Carnine et al. | 423/273 |
| 3,701,825 | 10/1972 | Radimer et al. | 423/273 |
| 3,903,244 | 9/1975 | Winkley | 423/272 |

FOREIGN PATENT DOCUMENTS 1032308 6/1978 Canada .
7401261 8/1974 Fed. Rep. of Germany ...... 423/272
1285151 8/1972 United Kingdom .
1446971 8/1976 United Kingdom .

Primary Examiner—O. R. Vertiz
Assistant Examiner—Wayne A. Langel
Attorney, Agent, or Firm—James J. Farrell; Melvin H. Kurtz

[57] ABSTRACT

Effective stabilization of aqueous hydrogen peroxide solutions is achieved by the addition of a stabilizing phosphonate compound of the general formula:

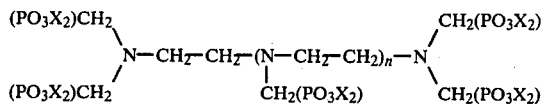

wherein $n = 1\text{-}4$; and $X = H$ or a water-soluble cation.

The stabilizing phosphonate compound is particularly effective for use with alkaline hydrogen peroxide solutions.

5 Claims, No Drawings

STABILIZATION OF HYDROGEN PEROXIDE

BACKGROUND OF THE INVENTION

This invention relates to the stabilisation of aqueous hydrogen peroxide solutions, especially under alkaline conditions. The invention also relates to the preparation of storage-stable alkaline hydrogen peroxide solutions which can be used as a base for liquid bleach products.

Hydrogen peroxide decomposes to water and oxygen and cannot be kept for long unless it is properly stabilised.

Decomposition of hydrogen peroxide occurs mainly in a catalysed reaction, of which the active catalysts are trace amounts of indigenous transition metal ions, such as copper, iron, cobalt and manganese ions, and as such can in principle be reduced by adding suitable metal complexing agents. Indeed many stabilisers for hydrogen peroxide known in the art are complexing agents and just as many stabilisers have been suggested and used for solving, at least partially, the decomposition problem of hydrogen peroxide solutions.

While the stabilisation of hydrogen peroxide is relatively easy in acid solution, i.e. at pH<<7, where the concentration of reactive $HO_2^-$ ions—the active form of hydrogen peroxide—is minimal, it has heretofore been considered as practically impossible to achieve a satisfactory stabilisation of hydrogen peroxide under alkaline conditions. The term "alkaline" as used here is meant to indicate alkaline pH values of above 7, particularly between 8 and 14.

Indeed many complexing agents developed heretofore as stabilisers for use with hydrogen peroxide solutions and which give satisfactory stabilisation of hydrogen peroxide under acid conditions, are poor stabilisers and hence unsuitable when used with hydrogen peroxide under alkaline conditions, particularly at pH above 8.

For this reason hydrogen peroxide is presented commercially as product concentrates having a pH lying generally within the range of 2-5, mostly between 2 and 3. Acid hydrogen peroxide is, however, unsuitable for use as a bleach due to the low concentration of $HO_2^-$ ions, the active form of hydrogen peroxide. For effective bleaching an alkaline pH is a necessary requirement, the higher the pH the higher the $HO_2^-$ ion-concentration to provide for more effective bleaching. The selection of pH used will generally depend upon the substrate which is to be bleached. For textile bleaching a suitable pH is within the range of 8-12.5, preferably between 9 and 11.5, as higher pH's will tend to cause excessive fabric damage.

When said commercial acid hydrogen peroxide solution is made alkaline, e.g. with sodium hydroxide, to a suitable bleaching pH with or without dilution with water to any desired concentration, it becomes unstable and cannot be stored without quickly losing its activity.

Stabilisers which have been suggested for use with hydrogen peroxide solutions include dipicolinic acid (DPA) as described in U.S. Pat. No. 2,624,655; ethylenediamine tetra acetic acid compounds (EDTA) as described in British Pat. No. 1,285,151; amino tri-(lower alkylidene phosphonic acid) compounds, e.g. sodium nitrilo tri-(methylene phosphonate) as described in British Pat. No. 1,119,221; alkylidene-diphosphonic acid derivatives, e.g. ethane-1-hydroxy-1,1-diphsophonate (EHDP) as described in British Pat. No. 925,373; and ethylenediamine tetra methylene phosphonic acid) as described in U.S. Pat. No. 3,701,825.

Most of these known stabilisers, though having some ability to inhibit decomposition of hydrogen peroxide under acid conditions, are however poor stabilisers for alkaline hydrogen peroxide solutions, and are suitable or even unsuitable for producing satisfactory storage-stable alkaline hydrogen peroxide solutions.

SUMMARY OF THE INVENTION

It is therefore an object of the invention to improve the stability of hydrogen peroxide solutions, especially under alkaline conditions.

It is another object of the invention to provide a stabiliser for hydrogen peroxide which is much better than the hitherto known stabilisers for use with alkaline hydrogen peroxide solutions.

Still another object of the invention is to provide alkaline hydrogen peroxide solutions which are sufficiently stable on storage to achieve an acceptable shelf-life.

It has now been found that these and other object which will be apparent hereinafter can be achieved if the hydrogen peroxide solution includes a stabilising phosphonate compound of the following general formula:

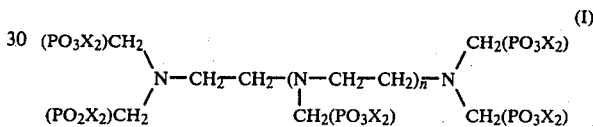
(I)

wherein n=1-4; and X=H or a water-soluble cation. The various X groups may be the same or different. Typical examples of useful cations are alkali metals, ammonium, substituted ammonium and alkaline earth metals, such as calcium and magnesium.

DESCRIPTION OF THE INVENTION

The invention therefore provides an aqueous hydrogen peroxide solution stabilised against decomposition, containing a stabilising amount of a phosphonate compound of the following general formula:

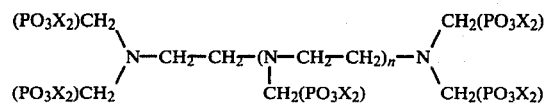

wherein n=1-4; and X is H or a water-soluble cation, selected from the group consisting of alkali metals, ammonium, substituted ammonium and alkaline earth metals.

Preferred compounds have n=1-2 and preferably X is hydrogen, ammonium, sodium or potassium or mixtures thereof.

The addition of any amount of the above-described stabilising phosphonate compound to hydrogen peroxide solutions of any pH and of any concentration, results in the beneficial effect of inhibiting the hydrogen peroxide decomposition. The invention is however of particular importance for inhibiting the decomposition of hydrogen peroxide solutions under alkaline conditions. Advantageously the stabilising phosphonate compound can be used with alkaline solutions of hydrogen peroxide of a concentration of about 5–20% by weight and having a pH of about 8–14.

The preferred amount of stabilising phosphonate compound depends upon the pH of the hydrogen peroxide solution and the anticipated amount of impurities that may enter the hydrogen peroxide solution to be stabilised.

Generally the amount of stabilising phosphonate compound used will be at least 0.01% by weight of the hydrogen peroxide in the aqueous hydrogen peroxide solution. Preferably an amount of between 0.03 and 1.0% by weight is used for stabilising an acid hydrogen peroxide solution, and from 0.1–10% by weight, more preferably from 0.2–5.0% by weight for stabilising an alkaline hydrogen peroxide solution, the percentages being of the weight of the hydrogen peroxide in the aqueous hydrogen peroxide solution.

The maximum amount of the stabilising phosphonate compound that can be present in the hydrogen peroxide solution is limited only by practical and economic considerations in that concentrations beyond the above upper levels, although functional, impart little or no advantage over lower percentages. Higher levels of the stabilising compound would also tend to give a reduced bleachng due to interaction between the bleaching species and the stabilising compound.

The stabilised hydrogen peroxide solutions of the invention can be of any desired concentration and of any desired pH; however preferred practice is to stabilise bleaching hydrogen peroxide solutions having a concentration of from about 5 to 20% by weight and an alkalinity of from about pH 8 to pH 12.5. The preferred concentration of the stabilised hydrogen peroxide solution is from about 5–10% by weight; the preferred pH of the stabilised hydrogen peroxide is between 9 and 11.5.

EXAMPLES

Stability studies were carried out on 5% w/v $H_2O_2$ solutions at pH of around 10 and a temperature of 40° C. At the 5% level the $H_2O_2$ has a similar oxidising capacity to (a) 10% NaOCl used in liquid chlorine bleach, or (b) 25% sodium perborate used in fabric washing powders. The comparatively high temperature of 40° C. was chosen deliberately to accelerate the test. The 5% w/v $H_2O_2$ test solution was made by diluting a 28% w/v $H_2O_2$ solution sample (ex Hopkins and Williams) with dionised water. As received the 28% w/v $H_2O_2$-solution had a pH ~2 and for test purposes this was raised to about 10 with NaOH. The residual $H_2O_2$ in the test solution was monitored periodically during storage at 40° C. using the iodine/thiosulphate method. From the plot of % residual $H_2O_2$ vs. time the half decomposition time of the solution was found. The experiments were carried out with two members of the stabilising phosphonate compound of formula I within the invention(-Runs 19 and 20) and compared with a variety of other known stabilisers and metal ion complexing agents (Runs 2–18), added in most cases at a levdel of 0.03% by weight of the solution.

Run 1 with no stabiliser added was used as a control. The results showing average half decomposition lives of each solution from repeated tests are given in the Table below.

TABLE

| Run | Additive | Trade name (if known) | Initial pH | Half decomposition time at 40° C. (hours) |
|---|---|---|---|---|
| 1. | None | — | 9.82 | ~1 |
| 2. | 0.03% w/v ethylenediamine tetra (ethoxyphosphonic acid) | — | 9.94 | ~1 |
| 3. | 0.1% w/v dipicolinic acid DPA | — | 9.78 | ~1 |
| 4. | 0.03% w/v ethylendiamine di-(o-hydroxyphenyl acetic acid) | Chel DP | 9.85 | 5 |
| 5. | 0.03% w/v hydroxypropylenediamine tetra acetic acid | Chel U | 9.95 | 3 |
| 6. | 0.03% w/v hexamethylenediamine tetra (methylene phosphonic acid) | Dequest 2051 | 9.94 | 3 |
| 7. | 0.1% w/v nitro triacetic acid-NTA | — | 9.80 | 6 |
| 8. | 0.03% w/v dodecylamine di-(methylene phosphonic acid) | Dequest 2071 | 9.95 | 7 |
| 9a. | 0.03% w/v ethylenediamine tetra acetic acid-EDTA | Various | 9.84 | 10 |
| 9b. | 0.40% w/v ethylenediamine tetra acetic acid-EDTA | Various | 9.87 | 8 |
| 10. | 0.03% w/v diethylenetriamine penta acetic acid-DETPA | Chel 330 | 9.82 | 12 |
| 11. | 0.03% w/v sodium nitrilo tri-(methylene phosphonate) | Dequest 2006 | 9.92 | 24 |
| 12. | 1.0% w/v sodium silicate | — | 10.12 | 28 |
| 13a. | 0.03% w/v ethane hydroxy di-phosphonate-EHDP | Dequest 2010 | 9.80 | 29 |
| 13b. | 0.4% w/v ethane hydroxy di-phosphonate-EHDP | Dequest 2010 | 10.1 | 203 |
| 14a. | 0.03% w/v ethylenediamine tetra (methylene phosphonic acid) EDTMP | Dequest 2041 | 9.90 | 417 |
| 14b. | 0.30% w/v ethylenediamine tetra (methylene phosphonic acid) EDTMP | Dequest 2041 | 10.43 | 232 |
| 15a. | 0.18% w/v N,N-bis(carboxymethyl)-aminomethane diphosphonic acid | — | 10.05 | 29 |

TABLE-continued

| Run | Additive | Trade name (if known) | Initial pH | Half decomposition time at 40° C. (hours) |
|---|---|---|---|---|
| 15b. | 0.24% w/v N,N-bis(carboxymethyl)-aminomethane diphosphonic acid | — | 10.02 | 223 |
| 15c. | 0.40% w/v N,N-bis(carboxymethyl)-aminomethane diphosphonic acid | — | 9.96 | 188 |
| 15d. | 0.75% w/v N,N-bis(carboxymethyl)-aminomethane diphosphonic acid | — | 10.02 | 143 |
| 16a. | 0.012% w/v N,N-bis(carboxymethyl)-aminoethane 1,1-diphosphonic acid | — | 10.08 | 7 |
| 16b. | 0.16% w/v N,N-bis(carboxymethyl)-aminoethane, 1,1-diphosphonic acid | — | 10.02 | 68 |
| 16c. | 0.4% w/v N,N-bis(carboxymethyl)-aminoethane, 1,1-diphosphonic acid | — | 9.98 | 124 |
| 16d. | 0.75% w/v N,N-bis(carboxymethyl)-aminoethane 1,1-diphosphonic acid | — | 9.96 | 246 |
| 17a. | 0.03% w/v aminoethane 1,1-diphosphonic acid | — | 10.18 | 1.5 |
| 17b. | 0.40% w/v aminoethane, 1,1-diphosphonic acid | — | 10.14 | 3.3 |
| 18a. | 0.06% w/v 1,3,5-tricarboxypentane-3-phosphonic acid | — | 10.16 | 0.65 |
| 18b. | 0.8% w/v 1,3,5-tricarboxypentane-3-phosphonic acid | — | 10.20 | 0.25 |
| 19. | 0.03% w/v diethylenetriamine penta (methylene phosphonic acid) | Dequest 2060 | 9.85 | 932 |
| 20. | 0.03% w/v triethylenetetramine hexa (methylene phosphonic acid) | — | 9.91 | 812 |

"Dequest" is a trade name used by Monsanto for their phosphonate complexing agents.

"Chel" is a trade name used by Ciba-Geigy.

The results show the outstanding stability of the hydrogen peroxide solutions of the invention (Runs 19 and 20) as compared with the other hydrogen peroxide solutions outside the invention (Runs 2–18).

I claim:

1. An aqueous hydrogen peroxide solution having a pH of about 7 stabilized against decomposition, containing a phosphonate compound of the following general formula:

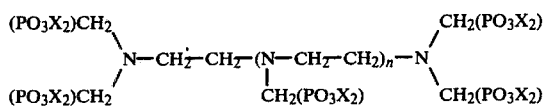

wherein n=1–4; and X is H or a water-soluble cation, selected from the group consisting of alkali metals, ammonium, substituted ammonium and alkaline earth metals, said phosphonate compound being present in an amount of 0.01 to 10% by weight of the hydrogen peroxide in the stabilized hydrogen peroxide solution.

2. An aqueous hydrogen peroxide solution according to claim 1, having a $H_2O_2$ concentration of from about 5 to 20% by weight and a pH of from about 8 to 12.5.

3. An aqueous peroxide solution according to claim 2, having a $H_2O_2$ concentration of 5 to 10% by weight and a pH of between 9 and 11.5.

4. An aqueous hydrogen peroxide solution according to claim 1, wherein n=1–2; and X is selected from the group consisting of hydrogen, ammonium, sodium and potassium cations.

5. An aqueous hydrogen peroxide solution according to claim 1, wherein said amount is between 0.2 and 5% of the weight of the hydrogen peroxide in the stabilised hydrogen peroxide solution.

* * * * *

UNITED STATES PATENT AND TRADEMARK OFFICE
CERTIFICATE OF CORRECTION

PATENT NO. : 4,304,762
DATED : December 8, 1981
INVENTOR(S) : Arthur George Leigh It is certified that error appears in the above—identified patent and that said Letters Patent is hereby corrected as shown below:

Claim 1, lines 42 and 43: "having a pH of about 7" should read -- having a pH of above 7 --.

Claim 3, line 43: "An aqueous peroxide" should read -- An aqueous hydrogen peroxide --.

Signed and Sealed this

Ninth Day of August 1983

[SEAL]

Attest:

GERALD J. MOSSINGHOFF

*Attesting Officer*  *Commissioner of Patents and Trademarks*